United States Patent [19]

Schertler

[11] 4,241,644

[45] Dec. 30, 1980

[54] PNEUMATIC ACTUATOR

[75] Inventor: Siegfried Schertler, Haag, Switzerland

[73] Assignee: Vat Aktiengesellschaft fuer Vakuum-Apparate Technik, Haag, Switzerland

[21] Appl. No.: 963,809

[22] Filed: Nov. 27, 1978

[30] Foreign Application Priority Data

Dec. 10, 1977 [DE] Fed. Rep. of Germany ....... 2755239

[51] Int. Cl.³ ...................... F01B 31/00; F15B 13/042
[52] U.S. Cl. ........................................ 91/447; 91/400; 91/451; 92/162 R; 277/3; 277/27
[58] Field of Search ............... 92/162 R, 183; 91/402, 91/400, 450, 451, 447; 277/3, 27

[56] References Cited

U.S. PATENT DOCUMENTS

| | | | |
|---|---|---|---|
| 1,062,749 | 5/1913 | Townsend | 91/402 |
| 2,426,613 | 9/1947 | Jackson | 277/3 |
| 2,624,320 | 1/1953 | Williams | 91/402 |
| 3,315,968 | 4/1967 | Hanlon | 277/3 |
| 3,572,211 | 1/1969 | Doyle | 92/162 R |

Primary Examiner—Paul E. Maslousky
Attorney, Agent, or Firm—Toren, McGeady and Stanger

[57] ABSTRACT

A pneumatic actuator in which a piston and a cylinder define an annular gap therebetween axially connecting two portions of the cylinder cavity otherwise separated by the piston. When compressed air is admitted to one of the cavity portions, an O-ring in an annular groove of the cylinder wall is expanded by the compressed air and seals the gap, and the piston is moved against the restraint of a strong compression spring. When the air backing the O-ring is vented, the air pressure in the cylinder drives the O-ring back into the groove, and air thereafter escapes quickly from the one portion of the cavity through the gap and into the other cavity portion which is open to the atmosphere. The resulting quick movement of the piston by the expanding compression spring is transmitted to a device outside the cylinder for operating the same.

8 Claims, 4 Drawing Figures

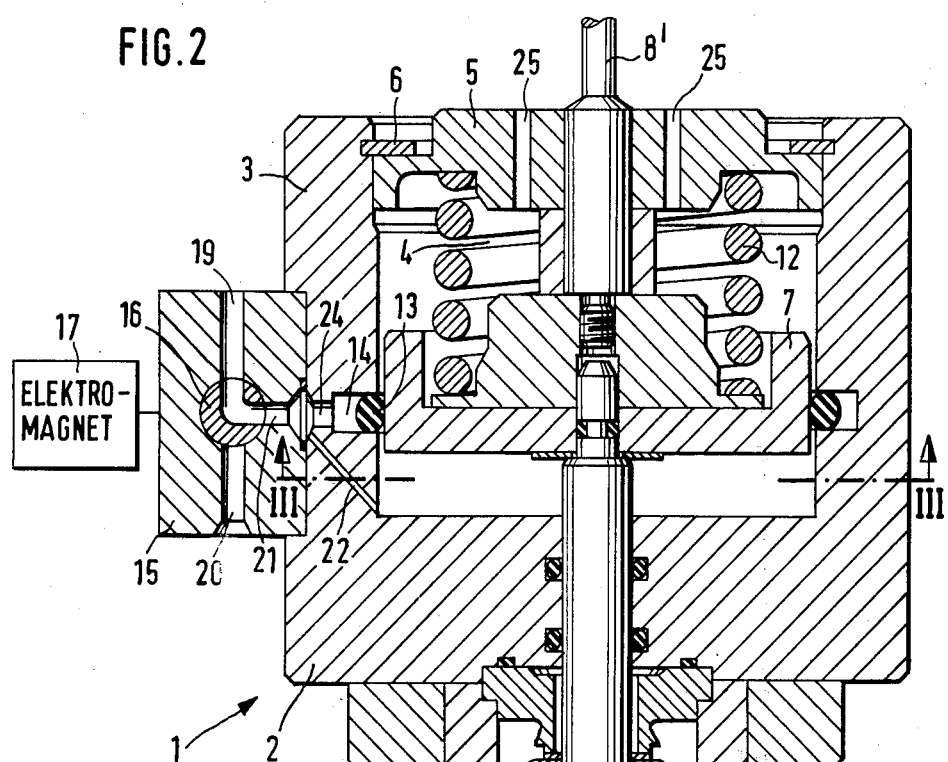

PNEUMATIC ACTUATOR

The invention relates to pneumatic actuators, and particularly to a pneumatic actuator including a cylinder and a piston movable in the cylinder in which the piston moves rapidly in response to a change in the pressure of a gas being fed to or withdrawn from the cylinder.

It is well known to operate valves and other closures, electrical switches, and the like by means of a pneumatic actuator including a cylinder bounding a cavity therein, a piston separating two portions of the cavity, and a piston rod transmitting movement of the piston to an object outside the cavity when the piston moves under a pressure differential between the two cavity portions brought about by admitting a gas under pressure to one cavity portion and/or withdrawing gas from a cavity portion, movement of the gas into and out of the cylinder cavity being controlled by a valve.

For many important applications of such actuators, the time required for moving the piston between its terminal positions must be extremely short, and should not exceed 20 milliseconds in many instances. One element determining the duration of the piston movement is the control valve, usually operated by a solenoid. Because of the self-inductance of the solenoid coil, a control valve of relatively large effective flow section is opened only gradually by a solenoid having a correspondingly large coil, and a valve capable of being operated by a small solenoid normally has a flow section too small to supply the actuator with pressure fluid at the high rate necessary for quick piston movement. It has been attempted to overcome the resulting difficulties by relatively complex valve arrangements or by the use of expensive helium instead of compressed air or nitrogen whose viscosity is significantly greater than that of helium.

It is the primary object of this invention to provide a simple pneumatic actuator of the general type described in which the piston moves between its terminal positions within 20 milliseconds or less when the actuator is operated by means of compressed air or nitrogen, and the flow of the gas is controlled by a solenoid valve.

In its more specific aspects, the actuator of the invention includes a cylinder and a piston axially movable in the cylinder cavity. A face of the cylinder circumferentially bounding the cavity and the piston radially defines a gap therebetween which connects the two axial portions of the cavity otherwise separated by the piston. A recess in the circumferential cylinder face receives a sealing member movable in sealing engagement with the cylinder toward and away from a position in which the sealing member bridges the gap, engages the piston, and thereby seals the two cavity portions from each other. A control valve admits gas under pressure to one of the cavity portions and to a part of the recess sealed from the gap by the sealing member, and alternatively releases the admitted gas from the cavity portion and the recess part. The resulting motion of the piston is suitably transmitted to an object outside the cylinder cavity which is to be actuated.

Other features, additional objects, and many of the attendant advantages of this invention will be apparent as the same becomes better understood from the following detailed description of a preferred embodiment and modifications thereof, when considered in connection with the appended drawing in which:

FIG. 2 illustrates the apparatus of FIG. 1 in a different operating position;

FIG. 3 shows elements of a modified actuator in a sectional bottom plane view taken on a line corresponding to line III—III in FIG. 2.

Figure 1:
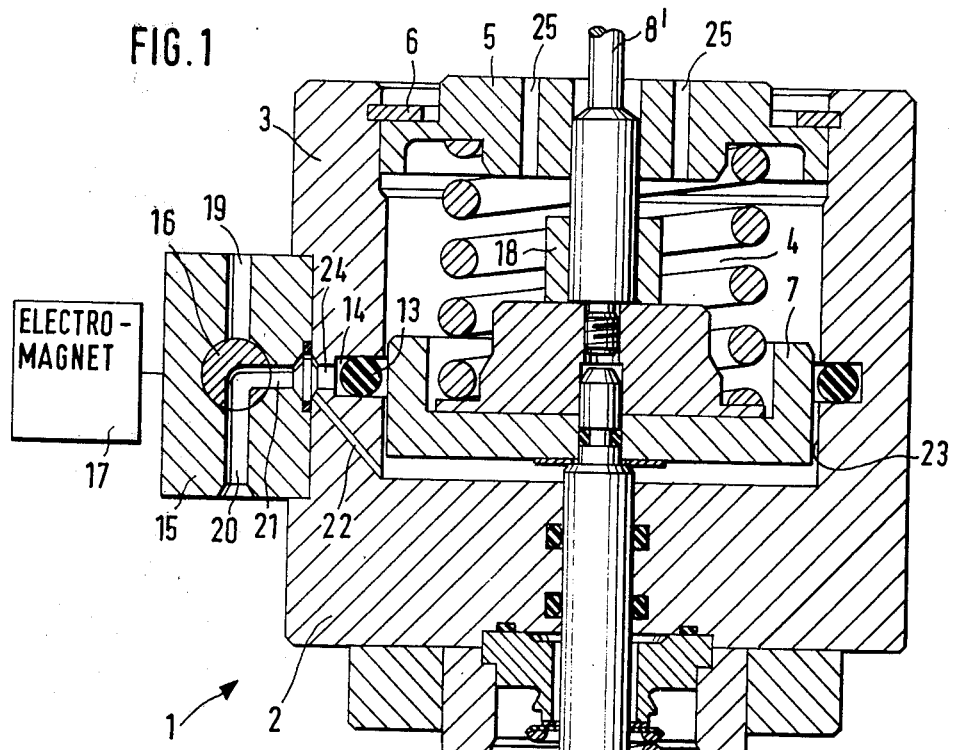
FIG. 1 shows an actuator of the invention and associated devices in elevational section.

Referring initially to FIG. 1, there is shown an approximately cup-shaped cylinder 1 whose bottom wall portion 2 and axially extending circumferential wall portion 3 are integrally connected to bound the circumferential periphery and one end of the cylinder cavity 4. A cover 5 secured to the wall portion 3 by a spring clip 6 bounds the cavity 4 in the other end. A piston 7 mounted on a piston rod 8 located is axially movable in the cavity 4. The piston rod 8 extends from the piston 7 through annular seals in a central opening of the bottom wall portion 2 into the casing 9 of an angle valve 11 operated by the moving piston 7, a valve disk 10 being mounted on the valve rod 8 in the casing 9 and closing the valve 11. The other end of the piston rod 8 is guided in a bore of the cover 5 and its portion 8' in the ambient atmosphere outside the 4 may indicate the piston position and the open or closed condition of the valve 11. A helical compression spring 12 coiled about the piston rod 8 between the piston 7 and the cover 5 biases the piston toward the valve-closing position shown in FIG. 1.

An O-ring 13 of elastomeric material is received in an annular groove 14 of the circumferential wall portion 3 whose axial width is smaller than the relaxed diameter of the O-ring so as to hold the O-ring under axial compressive stress in all operative positions, and thereby in sealing engagement with the cylinder 1. The valve disk 10 and a spacer tube 18 on the piston rod 8 between the piston 7 and the cover 5 limit the piston stroke in such a manner that the O-ring 13 is aligned opposite the cylindrical, circumferential face of the piston 7 at all times.

The casing 15 of a three-way plug valve is sealed to the outer circumferential surface of the cylinder portion 3. The plug 16 of the three-way valve is turned by an electromagnet or solenoid 17 in a conventional manner, not specifically illustrated, between the positions respectively shown in FIGS. 1 and 2. In the angle-valve closing position of the actuator shown in FIG. 1, the plug 16 seals an inlet bore 19 in the casing 15 which is connected to a non-illustrated compressed-air line and compressor, and thus constitutes a source of pressure gas. The plug 16 connects a vent bore 20, open to the atmosphere, with a bore 21 in the casing 15 and a bore 24 in the cylinder portion 3 leading into the part of the groove 14 which is sealed from the cylinder cavity 4 by the O-ring 13. A throttling passage 22 of much smaller effective flow section than the bore 24 connects the latter with a portion of the cavity 4 bounded transversely of the axial direction by the bottom wall portion 2 and the piston 7 in all operative positions of the piston.

The outer diameter of the piston 7 is smaller than the inner diameter of the axial cylinder wall portion 3 so that respective cylindrical faces of the piston 7 and cylinder 1 define therebetween a circular gap 23. The gap connects the two portions of the cavity 4 separated by the piston 7. Its effective flow section is much greater than that of the bore 24, but smaller than the combined flow sections of axial bores 25 in the cover 5 which connect the cavity 4 with the ambient atmosphere, only two bores 25 being visible in the drawing.

When the valve plug 16 is turned 180° by the electromagnet or solenoid 17, compressed air is admitted to the groove 14 behind the O-ring 13 more quickly than it is admitted to the cavity 4 through the throttling conduit of the passage 22, and the O-ring is pressed from the groove 14 into sealing engagement with the piston 7. The portion of the cavity 4 near the bottom wall portion 2 thus being sealed from the remainder of the cavity, pressure builds up below the piston 7 and the piston is shifted upward against the restraint of the spring 12 as far as permitted by the spacer tube 18, the valve disk 10 thereby being lifted from its seat. The angle valve 11 remains in the open position as long as the angular position of the plug 16 shown in FIG. 2 is maintained.

When the plug 16 is returned to the venting position of FIG. 1, the air pressure backing the O-ring 13 in the groove 14 is reduced much more quickly than the pressure in the bottom part of the cavity 4, and the O-ring is driven completely into the groove 14, permitting the bulk of the air in the lower portion of the cavity to escape quickly through the gap 23 and the bores 25. The spring 12 closes the angle valve 11. The spring 12 is readily dimensioned to perform the closing stroke of the piston 7 in a few milliseconds.

Oscillographic investigation of an actual valve arrangement identical with that shown in FIGS. 1 and 2 and including an angle valve whose valve seat opening had a diameter of 10 mm showed that the total elapsed time between the closing of a switch energizing the solenoid 17 and the seating of the valve disk 10 could be kept at about 15 milliseconds, the actual movement of the piston taking only 2.5 to 3.5 milliseconds.

Because of the axial symmetry of the actuator and of the coaxial valve disk 10 shown in FIGS. 1 and 2, it is immaterial whether the piston 7 and piston rod 8 maintain their angular position relative to the cylinder 1. When operating a device which would be affected unfavorably by turning of the piston rod 8, the otherwise unchanged apparatus may be modified as shown in FIG. 3 to provide an axial rib 26 on the piston 7' guided in a groove of the cylinder 1'. The groove 14', otherwise analogous to the groove 14, does not extend about the piston axis in a closed loop, and it receives an elongated sealing member of circular cross section, not illustrated, which extends in an arc from one radial flank of the rib 26 to the other, a seal between the rib and the cylinder 1' (not shown) being mounted on the rib 26 in a conventional manner.

Figure 4:
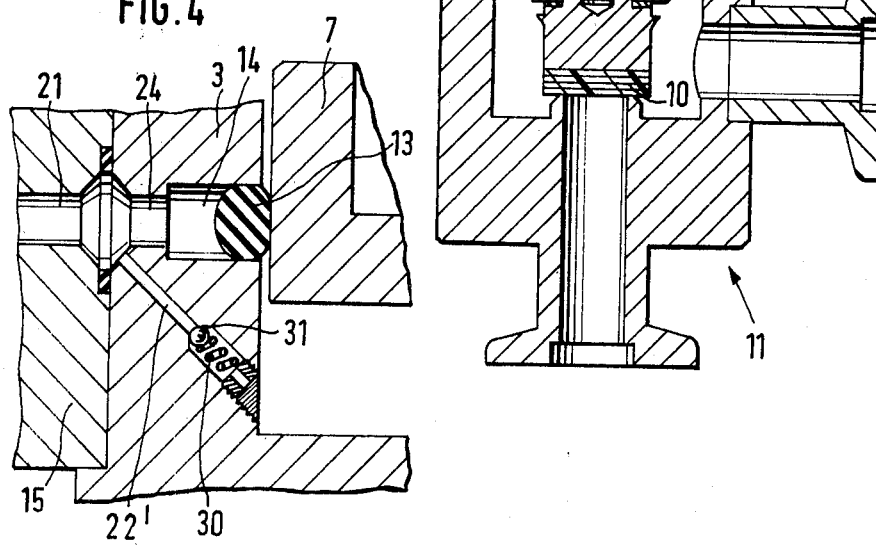
FIG. 4 is a fragmentary view on a larger scale of another modification of the apparatus of FIG. 2 in elevational section.

FIG. 4 shows a modification of the first-described apparatus in a fragmentary view corresponding to that of FIG. 2. The modified embodiment differs from the device of FIG. 2 only in a throttling passage 22' having an enlarged portion adjacent the cylinder cavity which is equipped with a check valve consisting of a steel ball 31 backed by a spring 30. While the check valve somewhat impedes air flow inward of the cylinder cavity, and thereby enhances the throttling effect of the passage 22', it prevents outward air flow, and thereby hastens the retraction of the O-ring 13 into the groove 14 and the ensuing closing of the angle valve 11.

The downward stroke of the piston 7 and piston rod 8 in all illustrated embodiments of the invention is energized by the spring 12, and the spring is released by the collapse of air pressure in the previously closed portion of the cavity 4 between the piston 7 and the bottom wall portion 2. The air is released from the cavity through a flow path independent of the solenoid operated valve plug 16.

The angle valve 11 is merely illustrative of the type of equipment which is operated advantageously by the actuator of the invention. In the exemplary application of the invention, the valve is closed practically instantaneously and opened more slowly. Obviously, the valve mechanism, not in itself a part of the invention, may be modified to bring about instantaneous opening and slower closing. The manner of connecting the piston rod 8 to operating elements of other valves, to electrical switchgear, and to other devices outside the cavity 4 which can benefit from a quick actuating movement will be obvious to those skilled in the art.

A single bore 24 has been found adequate for connecting the groove 14 with the valve plug 16 when an angle valve of 10 mm nominal diameter is to be operated. In an actuator scaled up to operate heavier equipment, a circumferential manifold communicating with the plug 16 may be provided in or on the cylinder 1 and connected with the groove 14 by several circumferentially spaced radial bores. Similarly, more than one throttling passage 22 may be provided, and the structure illustrated in FIG. 4 may be duplicated in an analogous manner if so desired.

It should be understood, therefore, that the foregoing disclosure relates only to presently preferred embodiments, and that it is intended to cover all changes and modifications of the examples of the invention herein chosen for the purpose of the disclosure which do not depart from the spirit and scope of the appended claims

What is claimed is:

1. A pneumatic actuator comprising:
   (a) a cylinder having an axis and a face extending in the direction of and circumferentially about said axis, said face bounding a cavity within said cylinder;
   (b) a piston located within and being axially movable in said cavity, said piston extending transversely of the axis of said cylinder and dividing said cavity therein into a first portion and a second portion, said face and said piston defining a gap therebetween extending in the axial direction of said cylinder and, connecting said first and second portions of said cavity for affording a flow of gas therebetween.
      (1) said face being formed with a recess extending transversely of the axial direction of said cylinder and communicating with said gap;
   (c) a sealing member positioned in said recess and movable in said recess between a first position in sealing engagement with said cylinder within said recess and in spaced relation from said piston and a second position in sealing engagement within said recess with said cylinder and in which said second position said sealing member bridges said gap and is in sealing engagement with said piston, thereby sealing said first and second portions from the flow of gas therebetween;
   (d) control means selectively positionable for admitting a gas under pressure to said first portion and to a part of said recess sealed from said gap by said sealing member wherein the gas under pressure moves said sealing member from the first position into said second position, and for closing off the flow of gas under pressure and venting the gas under pressure from said first portion and from said part;

(e) and said second portion having at least one opening therefrom for venting the gas under pressure flowing through said gap from said first portion into said second portion when said sealing member is moved into the first position; and (f) motion transmitting means for transmitting the motion of said piston to an object outside said cavity.

2. An actuator as set forth in claim 1, wherein said recess and said sealing member are annular about said axis.

3. An actuator as set forth in claim 2, wherein said sealing member is an O-ring of resilient material received in said recess under compressive, axial stress.

4. An actuator as set forth in claim 1, wherein said control means include a source of said gas, a first conduit connecting said source to said first portion, and a second conduit connecting said source to said part, the effective flow section of said second conduit being greater than the effective flow section of said first conduit.

5. An actuator as set forth in claim 1, further comprising biasing means in said second portion of said cavity axially biasing said piston in the direction toward said first portion.

6. An actuator as set forth in claim 5, wherein said biasing means include a helical compression spring interposed between said piston and the end of said cylinder extending transversely of said axis and located in said second portion of said cavity.

7. An actuator as set forth in claim 1, wherein said cylinder member forms said at least one opening from said second portion connecting said second portion of said cavity to the atmosphere, the effective flow section of said at least one opening being greater than the effective flow section of said gap when said sealing member is in said first position thereof.

8. An actuator as set forth in claim 1, wherein said control means include a source of said gas, a first conduit connecting said source to said first portion, a second conduit connecting said source to said part, and check valve means in said first conduit selectively preventing flow of said gas outward of said one portion.

* * * * *